(No Model.)
C. PHILIPPOT.
COOKING UTENSIL.
No. 504,243. Patented Aug. 29, 1893.
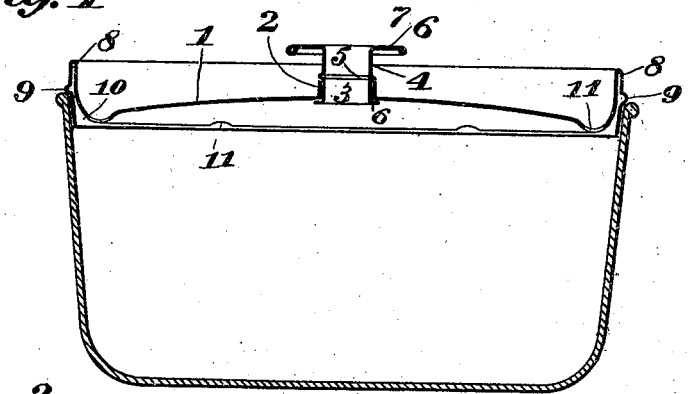
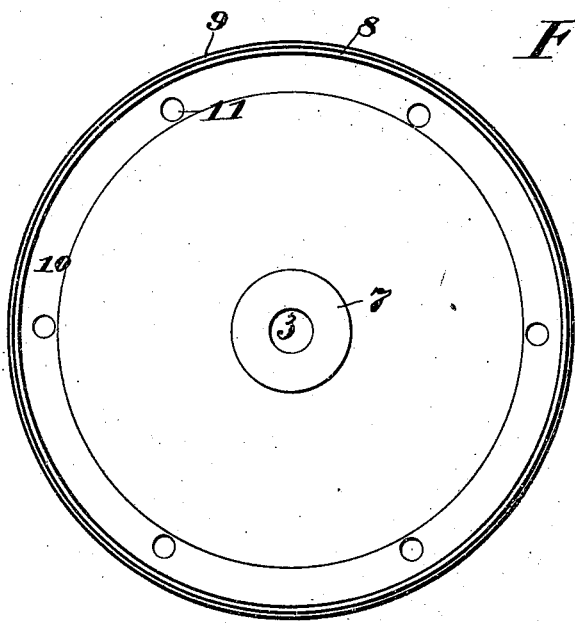
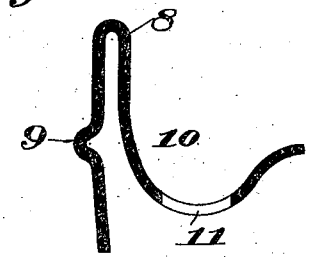
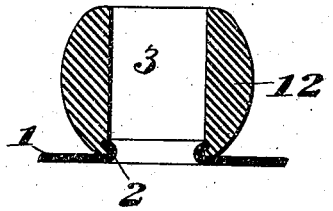
WITNESSES:
INVENTOR:
Charles Philippot
By G. Sittman
Attorney.

UNITED STATES PATENT OFFICE.

CHARLES PHILIPPOT, OF NEWARK, NEW JERSEY.

COOKING UTENSIL.

SPECIFICATION forming part of Letters Patent No. 504,243, dated August 29, 1893.

Application filed April 15, 1893. Serial No. 470,530. (No model.)

*To all whom it may concern:*

Be it known that I, CHARLES PHILIPPOT, a citizen of the United States, residing at Newark, in the county of Essex and State of New Jersey, have invented certain Improvements in Cooking Utensils, of which the following is a specification.

My invention relates to certain improvements in cooking utensils and more particularly to that class of such utensils which are employed for boiling milk and other liquids, and the object of my invention is to provide a device of this character which shall present certain novelties and utilities over other devices heretofore employed for the purpose all as will be hereinafter fully described.

The novel features of my invention will be carefully defined in the claims.

In order that my invention may be the better understood, I have illustrated in the accompanying drawings a device constructed according thereto, in which drawings—

Figure 1 is a vertical axial section of a vessel or utensil embodying my improvements and Fig. 2 is a plan of the same. Fig. 3 is a detail view of a portion of the rim of the cover to be hereinafter referred to and Fig. 4 is a detail view of a modification. The two latter views are drawn to an enlarged scale.

It is well known that when milk or other liquid is subjected to strong and sudden heat in a vessel, such liquid has always a tendency to boil over the sides of the vessel whereby great inconvenience is often occasioned, it being generally necessary to remove the vessel for a time from the heat in order to permit it to become cooled. This boiling over is usually caused by the formation of a comparatively large volume of vapor at the bottom of the vessel whereby the liquid is forced upward and thrown out.

The primary object of my invention is to provide a cover for vessels used for boiling such liquids by the use of which the boiling over of the liquid shall be prevented, and this cover I will now describe.

Referring to Figs. 1 and 2, 1 represents the body portion of the cover which is formed of sheet metal, as tin, for example, stamped so as to present a convex upper face and provided at its center with an integral upturned annular flange or bead 2, surrounding the central opening 3. Within this opening which forms a socket, is arranged the lower end of a short metal tube 4, having midway of its length a projecting annular bead 5, adapted to engage, when the tube is inserted into the socket, with the upper edge of the annular flange 2, whereby the tube is held at the proper height above the upper surface of the cover. The tube is made of such a length that its lower end projects slightly beyond the under surface of the cover, and this lower end is enlarged as indicated at 6, whereby the tube is secured firmly against removal from the socket. The upper end of the tube 2 is expanded or spun out to form an enlarged handle 7, by means of which the cover may be manipulated. The cover is provided at its periphery with an upturned rib or rim 8, of double thickness, one of the walls of which is provided on its outer side with a projecting bead 9 adapted to rest on the edge of the vessel to which the cover is applied whereby the cover is prevented from being dislodged while in use. Below the bead 9 this outer wall of the rim 8 is bent in slightly in the form of an inverted conic frustum, so as to better fit and enter the vessel to which the cover is applied. The formation of this rim 8 and the adjacent parts is clearly shown in Fig. 3 which is an enlarged sectional view thereof. Just inside the rim 8 the cover is provided with an annular depression 10, forming a channel the depth of which is sufficient to form a drain for the upper surface of the cover and in the bottom of this channel or depression 10 is formed a series of apertures 11 the combined area of which will be by preference considerably greater than the area of the central opening 3 in the cover.

In using my improved utensil, it is applied to the vessel containing the liquid to be boiled in the same manner as the ordinary cover being supported in place by the engagement of the bead 9 with the upper edge of the vessel. Should the milk or other liquid while boiling, be thrown out of the vessel it will pass out through the central opening 3 in the cover and falling on the inclined upper face of the cover will run down into the channel 10 and fall through the perforations 11 into the vessel near the walls thereof where of course, the cooler liquid lies.

In Fig. 4 I have shown a slightly modified form of handle which may in certain cases be employed in connection with my improved utensil. In this view the cover 1 is provided with a central aperture 3 and surrounding flange 2 about which is applied a centrally perforated knob 12 of japanned hard wood or metal, into the perforation in which the upper edge of the flange 2 is enlarged as clearly seen.

I do not wish to be understood as limiting myself to the precise construction of the utensil as herein shown as it is evident many changes and alterations may be made therein without material departure from the principles of my invention. For instance instead of making the cover in one piece it may also in some cases be made in several pieces.

Having thus described my invention, I claim—

1. A cover for cooking vessels having a raised rim arranged about its edges, the upper surface of said cover being convex at its center and provided with an annular depression or channel arranged between said central convex portion and the raised rim, said cover being also provided with a central perforation and with a series of perforations in the bottom of said annular channel or depression, substantially as set forth.

2. A cover for cooking vessels composed of a sheet of metal having a raised rim about its edges, said rim being formed of two thicknesses of metal, the upper surface of said cover being convex at its center and having an annular channel surrounding said convex portion, said cover having also a central perforation and a series of perforations in the bottom of said channel the outer thickness or ply of the raised rim extending below the base of said annular channel and having at its central part an outwardly projecting bead adapted to rest on the edges of the vessel, substantially as set forth.

In witness whereof I have hereunto signed my name in the presence of two subscribing witnesses.

CHARLES PHILIPPOT.

Witnesses:
LOUIS E. HENRIET,
LOUIS D. FRENOT.